United States Patent [19]

Iijima

[11] Patent Number: 5,200,665
[45] Date of Patent: Apr. 6, 1993

[54] ULTRASONIC ACTUATOR
[75] Inventor: Tamotsu Iijima, Yamanashi, Japan
[73] Assignee: Nisca Corporation, Yamanashi, Japan
[21] Appl. No.: 772,889
[22] Filed: Oct. 8, 1991
[30] Foreign Application Priority Data Nov. 21, 1990 [JP] Japan .................................. 2-316659

[51] Int. Cl.$^5$ ............................................. H01L 41/08
[52] U.S. Cl. .................................... 310/323; 310/328; 310/317
[58] Field of Search ............... 310/316, 317, 323, 328; 318/116

[56] References Cited

U.S. PATENT DOCUMENTS

| | | | |
|---|---|---|---|
| 4,019,073 | 4/1977 | Vishneusky et al. | 310/323 |
| 4,857,793 | 8/1989 | Okuno | 310/323 |
| 4,882,500 | 11/1989 | Iijima | 310/323 |
| 4,999,536 | 3/1991 | Toda | 310/323 |
| 5,039,899 | 8/1991 | Yamaguchi | 310/323 |
| 5,073,739 | 12/1991 | Iijima et al. | 310/323 |

FOREIGN PATENT DOCUMENTS

| | | | |
|---|---|---|---|
| 58-32518 | 7/1983 | Japan . | |
| 0239875 | 10/1987 | Japan | 310/323 |
| 0242178 | 10/1988 | Japan | 310/323 |
| 0277477 | 11/1988 | Japan | 310/323 |
| 0198284 | 8/1989 | Japan | 310/323 |
| 0308172 | 12/1989 | Japan | 310/323 |
| 0315277 | 12/1989 | Japan | 310/323 |
| 0315278 | 12/1989 | Japan | 310/323 |
| 0315279 | 12/1989 | Japan | 310/323 |
| 0007875 | 1/1990 | Japan | 310/323 |
| 0055585 | 2/1990 | Japan | 310/323 |
| 0262874 | 10/1990 | Japan | 310/323 |
| 0693493 | 10/1979 | U.S.S.R. | 310/323 |

OTHER PUBLICATIONS

Ferroelectrics, 1989, vol. 91, pp. 163-178, Tomikawa et al., "Ultrasonic Motors-Constructions/Characteristics/Applications".
Proceedings of the 7th Meeting on Ferroelectric Mateials and Thier Applications, 1989, Japanese Journal of Applied Physics, vol. 28, 1989, pp. 198-201, Y. Tomikawa, et al., "Same Phase Drive Type Ultrasonic Motors".
Sensors and Mateials, 1-6, 1989, pp. 359-379, Y. Tomikawa, et al., "A Paper Or Card Forwarding Device Using A Flat-Type Ultrasonic Motor".
Proceedings of 8th Symposium on Ultrasonic Electronics, 1987, Japanese Journal of Applied Physics, vol. 27, 1988, pp. 195-197, Y. Tomikawa, et al., "Construction of Ultrasonic Motors And Their Application".
Proceedings of 8th Symposium on Ultrasonic Electronics, 1987, Japanese Journal of Applied Physics, vol. 27, 1988, pp. 192-194, T. Takano, et al., "Ultrasonic Motors Using Piezoelectric Ceramic Multi-Mode Vibraors".
Proceedings of 9th Symposium on Ultrasonic Electronics, 1988, Japanese Journal of Applied Physics, vol. 28, 1989,, pp. 161-163, Y. Tomikawa, et al., "An Ultrasonic Motor Using Non-Axisymmetric Vibration Modes Of A Piezo-Ceramic Annular Plate".
Proceedings of 7th Meeting on Ferroelectric Materials and Their Applications, 1989, Japanese Journal of Applied Physics, vol. 28, 1989, pp. 202-205, T. Takano, et al., "An Ultrasonic Motor Using Non-Axisymmetric Vibration Modes Of A Piezo-Ceramic Annular".
Ferroelectrics, 1989, vol. 95, pp. 165-169, pp. 165-169, T. Takano, et al., "Ultrasonic Motors Using A Piezoelectric Ceramic Multi-Mode Vibrator".
IEEE 1989 Ultrasonic Symposium, Oct. 3-6, 1989, pp. 1-4, T. Takano, et al., "Constructions And Characteristics Of Ultrasonic Motors Using A Piezo-Ceramic Annular Plate".

Primary Examiner—Mark O. Budd
Attorney, Agent, or Firm—Oblon, Spivak, McClelland, Maier & Neustadt

[57] ABSTRACT

An ultrasonic actuator comprising an elastic vibration member of a rectangular plate is excited by vibrators attached to at broadest excitation surfaces, thereby concurrently inducing longitudinal and bending vibrations. Extraction of vibrational motion from the vibration member being excited to vibrate can be carried out by pressing a moving object against one of the most slender planes perpendicular to the excitation surfaces. Since the length in the direction in which the moving object is pressed against the vibration member is sufficiently larger, the vibrational characteristics of the vibration member can be prevented from being changed, and therefore, the moving object can be driven with high efficiency.

12 Claims, 7 Drawing Sheets

ULTRASONIC ACTUATOR

BACKGROUND OF THE INVENTION

1. Field of the Invention

This invention relates to an ultrasonic actuator using standing wave vibrations of longitudinal mode and bending mode, and more particularly to an ultrasonic actuator capable of efficiently driving a moving object without affecting the vibration characteristic of an elastic vibration member by extracting elliptic motions generated on one of opposite most slender planes of the vibration member shaped in a rectangular plate.

2. Description of the Prior Art

Standing wave vibrations or progressive wave vibrations of the natural mode are generated in an elastic vibration member being excited with an alternating current or vibrations having resonance frequency. Recently, these vibrations have been widely applied to mechanical-electric filters, various ultrasonic motors and so on.

The ultrasonic motors have commonly employed a single-mode or multi-mode of standing wave vibrations which are caused by expansion and contraction motions generated in the vibration member in the ratio unchanged from a local point of view.

Figure 1A:
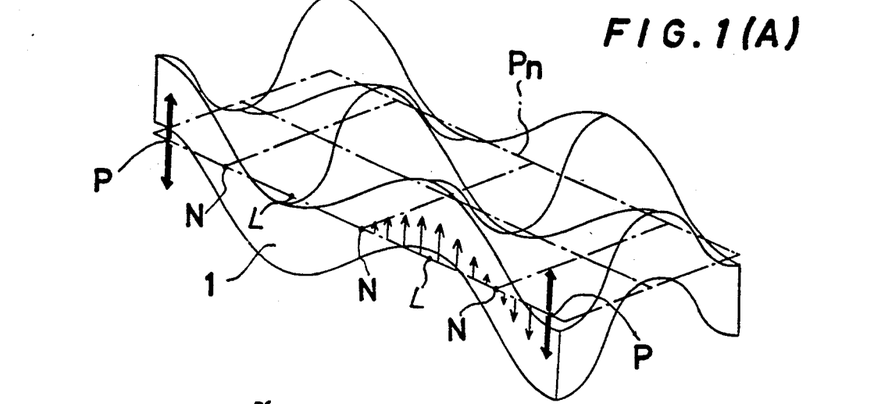
FIG. 1(A) is an explanatory diagram of bending vibrations induced in an elastic vibration member.
Figure 1B:
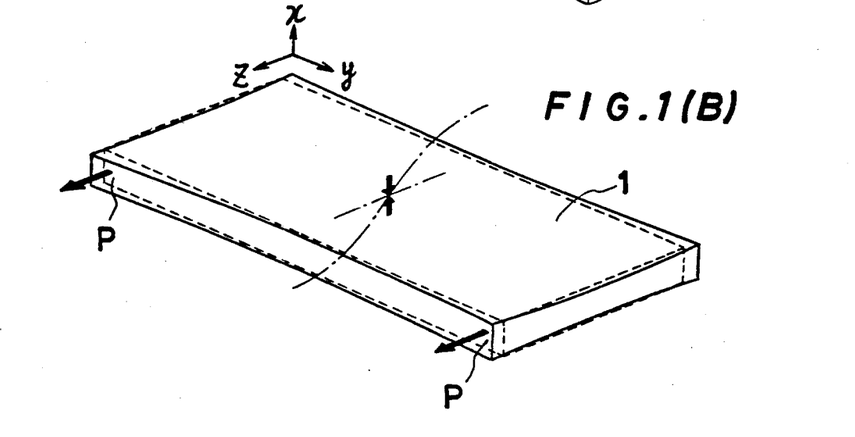
FIG. 1(B) is an explanatory diagram of longitudinal vibrations induced in an elastic vibration member.

As one example, there are bending mode, longitudinal mode and torsional mode in the standing wave vibrations. As illustrated in FIG. 1(A), the bending mode vibration is the periodic displacement motions which are generated (around the vibrational node N) in the opposite directions relative to the internal neutral plane Pn parallel to one excitation surface (broadest plane) of the vibration member 1. The longitudinal mode vibration is the expansion and contraction motions in the longitudinal (or width) direction of the vibration member 1 as shown in FIG. 1(B).

There has been proposed a "poking-type" ultrasonic motor using standing wave vibrations in Japanese Patent Publication No. SHO 58(1983)-32518(B2). This proposed ultrasonic motor is driven by the unidirectional expansion and contraction motions of the standing wave vibrations.

Figure 2A:
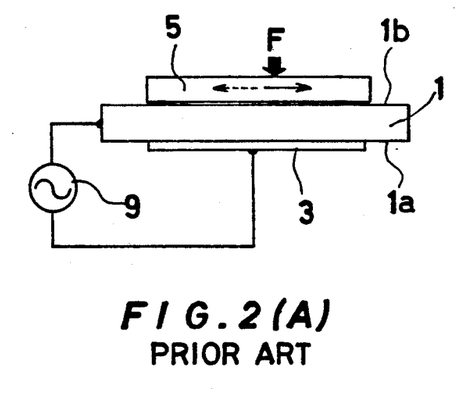
FIG. 2(A) is a schematic diagram of a prior art ultrasonic motor.

As a high-torque and high-efficient motor, ultrasonic motors utilizing torsional and longitudinal mode vibrations have been known. Also, in the commonly known actuator as shown in FIG. 2(A), the elastic vibration member 1 of a rectangular plate having opposite broadest surfaces 1a, 1b is provided on one of the broadest surfaces (excitation surface 1a) with the one vibrator 3 made of a piezoelectric material or the like to vibrate the vibration member. By pressing a plate-like moving object 5 against the other broadest surface 1b opposite to the excitation surface 1a of the vibration member 1 with considerably great force, the moving object is moved in one direction when the vibration member is excited to vibrate. In the drawings, reference numeral 9 denotes an exciting power source for applying to the vibrator 3 an alternating current having frequency resonant with the vibration member 1.

Figure 2B:
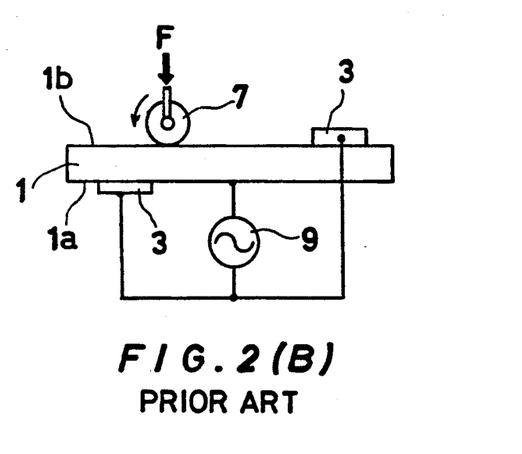
FIG. 2(B) is a schematic diagram of another prior art ultrasonic motor.

In a case of forcibly pressing a rotor 7 used as the moving object noted above against the vibration member 1 as shown in FIG. 2(B), the rotor 7 is rotated in one direction. In this ultrasonic motor, two vibrators 3 are attached one onto either side of the vibration member 1.

The standing wave motor utilizing the torsional and longitudinal vibrations has necessitated separate exciting power sources for inducing the respective modes of vibrations. In particular, the driving system (piezoelectric ceramic element polarized in the direction parallel to the electrodes) for inducing the torsional vibration different in structure from that of the longitudinal vibration has been required.

Although the conventional ultrasonic motors shown in FIGS. 2(A) and 2(B) are relatively simple in structure, these motors are disadvantageous in that both the moving objects 5 and 7 must be pressed against the vibration member 1 with considerably great force F. That is, the great pressing force imparted to the vibration member causes the resonant frequency characteristic inherent in the vibration member to be changed and/or undesirable bending vibrations to be induced. As a result, the conventional ultrasonic motors of this type have suffered a disadvantage such that large kinetic torque can in no way be brought about.

OBJECT OF THE INVENTION

This invention was made to remedy the drawbacks of the conventional ultrasonic motors as mentioned above, and its object is to provide a high-performance ultrasonic actuator having both simple structure innate in the standing wave motor utilizing longitudinal and bending vibrations and high-torque output characteristics innate in the standing wave motor utilizing longitudinal and torsional vibrations.

Another object of the invention is to provide an ultrasonic actuator capable of driving a moving object even by a single phase electric source with high torque without lowering the driving efficiency, and preventing the vibrational characteristics of a vibration member from being changed even when the moving object is forcibly pressed against the vibration member with great force to drive the moving object with high efficiency.

Still another object of the invention is to provide an ultrasonic actuator capable of fulfilling a reversible motor of small size, which is excellent in controllability and driving performance.

SUMMARY OF THE INVENTION

To attain the objects described above according to the present invention, there is provided an ultrasonic actuator comprising an elastic vibration member of a rectangular plate having a shape capable of concurrently inducing longitudinal and bending vibrations with resonant frequency and two opposite most slender planes, and at least one vibrator attached to one of opposite broadest surfaces of the vibration member and located at one of vibrational nodes of the longitudinal vibrations and one of vibrational loops of the bending vibrations induced in the vibration member, one of the most slender planes of the vibration member having at least one motion extracting means at one of loops of the longitudinal vibrations induced in the vibration member.

At least one moving object is pressed against the motion extracting means formed on the most slender plane of the vibration member to be driven. The vibrator attached onto the vibration member is made of a piezoelectric element or the like.

The motion extracting means defined on one of the opposite most slender planes of the vibration member is moved elliptically due to the longitudinal and bending vibrations which are concurrently generated in the vibration member by activating the vibrator attached onto the vibration member. Thus, the moving object can be driven by being pressed against the motion extracting means.

The motion extracting means may be protruded so that the moving object can be stably brought in contact with only the motion extracting means with ease. Otherwise, the moving object may be formed of a plate and provided on its lower surface with a fringe protrusion capable of reliably coming into contact with only the motion extracting means.

The opposite most slender planes of the rectangular plate-shaped vibration member are sufficiently separated from each other, meaning that the length in the direction of pressing the moving object against the vibration member is relatively larger. Therefore, although the moving object must be brought into press contact with the vibration member with great force in order to be driven with high efficiency, no stress deformation nor change in vibration characteristic is caused in the vibration member even when the moving object is forcibly pressed against the vibration member.

Since the moving object can be pressed against the vibration member with great force, vibrational energy brought about in the elastic vibration member can be extracted with notably high efficiency.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The ultrasonic actuator according to this invention uses standing wave vibrations of longitudinal mode and bending mode to be driven with high efficiency. The conditions in which the longitudinal and bending vibrations can be concurrently induced in an elastic vibration member will be described hereinafter with reference to a vibration system illustrated in FIG. 3.

Figure 3:
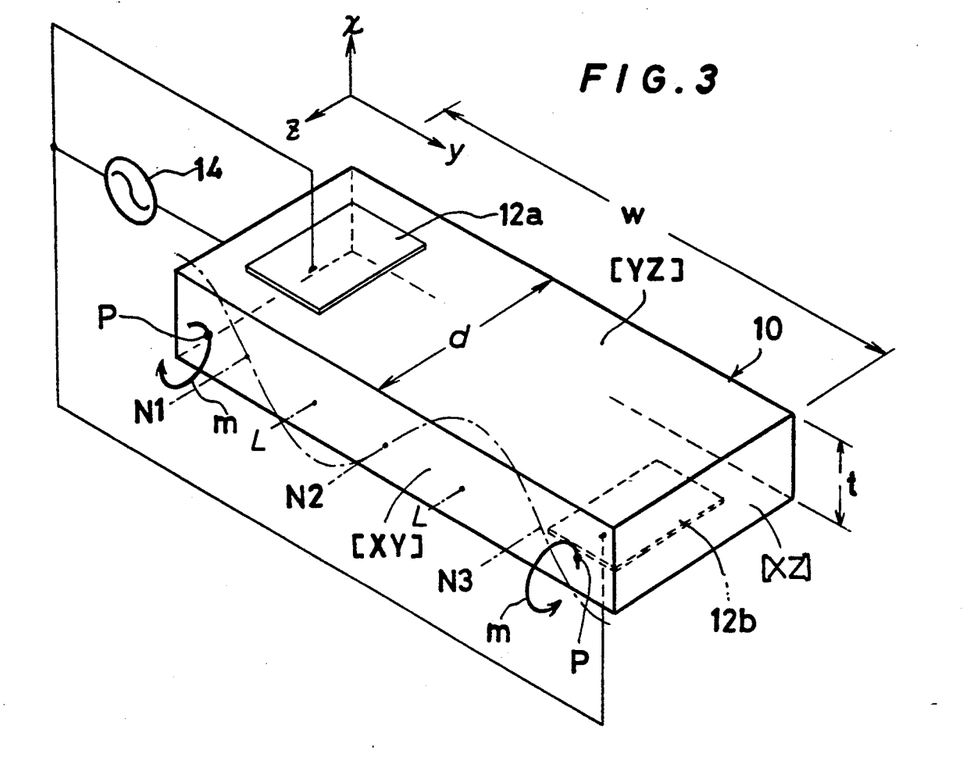
FIG. 3 is a schematic perspective view showing a vibration system for explaining the operating principle of the ultrasonic actuator according to this invention.

The elastic vibration member 10 used in the present invention is formed in the shape of a rectangular plate and made of a piezoelectric material or metallic material which is elastic relative to ultrasonic vibrations such as stainless steel and aluminum. The vibration member 10 has the width w (length in the y-direction) sufficiently larger than the depth d (length in the z-direction) and the thickness t (length in the x-direction) as shown in FIG. 3. Thus, the opposite rectangular planes [XY] which is perpendicular to the z-direction and defined by the width w and the thickness t are most slender in comparison with the other planes [YZ] and [XZ] perpendicular to the x- and y-directions. In this connection, the opposite most slender planes [XY] each have larger ratio between the adjacent perpendicular sides than those of the planes [YZ] and [XZ], and the side in the y-direction in the most slender plane is sufficiently longer than the side in the x-direction. The opposite planes [YZ] have the broadest area and serves as excitation surfaces.

Vibrators 12a, 12b are disposed one on either of the opposite broadest planes (excitation surfaces [YZ]) of the vibration member 10, which are defined by the width w and depth d. The vibrators 12a, 12b are formed of an electrostrictive or piezoelectric material, e.g. ferroelectric ceramics such as barium titanate and lead zirconate titanate (PZT). Between the vibration member 10 and the respective vibrators 12a, 12b is applied high-frequency alternating current derived from an exciting current source 14, consequently to cause the vibration member 10 to concurrently generate the longitudinal and bending vibrations.

The condition under which the longitudinal and bending vibrations are concurrently generated in the vibration member 10 is determined in accordance with the width w (length in the y-direction), depth d (length in the z-direction), and thickness t (length in the x-direction) which are all resonant with the frequency of the alternating current applied to the vibration member 10. That is, the vibration member 10 is formed so that the width, depth and thickness thereof each are integral multiples of one half of the wavelength of the vibrations induced in the vibration member.

The relation among width w, depth d and thickness t which causes the vibration member to concurrently generate the longitudinal and bending vibrations is expressed by the following equation:

$$(\pi/2d) = (a^2/w^2)(t/\sqrt{12}) \quad (1)$$

In the equation, $a$ represents the degree of the vibrations induced in the vibration member. The above equation is a general expression obtained where the resonance frequency $fL$ of the longitudinal vibration and the resonance frequency $fB$ which are given by the following equations (2) and (3) are substantially equal to each other ($fL = fB$) or approximate to each other ($fL \approx fB$).

$$fL = (1/2d)(E/\sigma) \quad (2)$$
$$fB = (a^2/2\pi w^2)\{(\sqrt{(E/\sigma)}\}(t/\sqrt{12}) \quad (3)$$

wherein, E represents the Young's modulus, and $\sigma$ the density of the vibration member.

Where the conditions expressed by the above equation (1) is satisfied, the length, width and thickness of the vibration member 10 may be arbitrarily determined. Under this condition, the desired bending vibration can be concurrently induced with the longitudinal vibration by applying the single phase alternating current of resonance frequency for producing the longitudinal vibration from the exciting means to the vibration member 10.

In the embodiment illustrated in FIG. 3, antisymmetric bending vibrations are induced in the vibration member 10, forming the vibrational nodes N1 to N3 at which the vibrational amplitude becomes zero and vibrational loops L at which the vibrational amplitude becomes maximum. The vibrators 12a, 12b are positioned at the opposite-phase positions of the vibrational loops L of the bending vibrations. To be more specific, the vibrator is positioned at one of the vibrational nodes N1 and N3 of the longitudinal vibrations and one of the vibrational loops L of the bending vibrations.

Under the conditions described above, the bending vibrations as shown in FIG. 1(A) and the longitudinal vibrations as shown in FIG. 1(B) are concurrently generated in the vibration member 10. At the end portions P (motion extracting means) on the most slender plane [XY] perpendicular to the excitation surface [YZ] of the vibration member 10 which includes the loops of the longitudinal vibrations, the bending vibrations bring about amplitude motions in the thickness direction (x-direction), and concurrently, the longitudinal vibrations bring about amplitude motions in the depth direction (z-direction). When a moving object is pressed to the end portion P on the most slender plane, the the moving object simultaneously acquires a floating force from the bending vibrations and a lateral driving force in the x-direction from the longitudinal vibrations. As a result, elliptic motions m appear at the positions P as shown in FIG. 3.

Figure 4A:
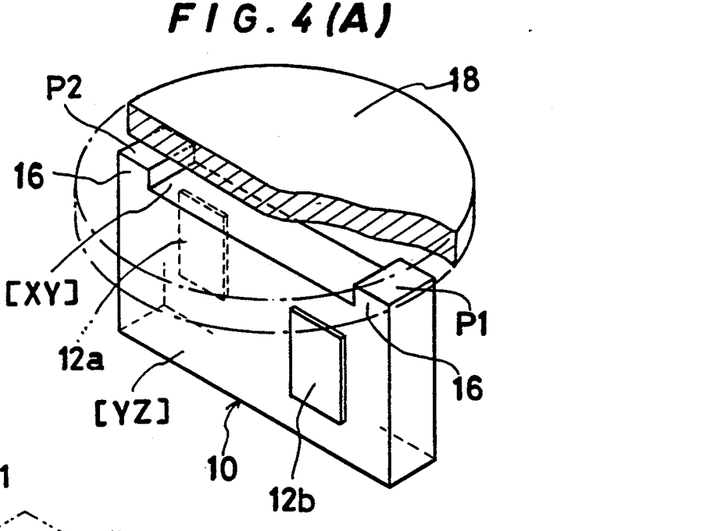
FIG. 4(A) is a partially sectioned perspective view schematically showing a first embodiment of this invention.
Figure 4B:
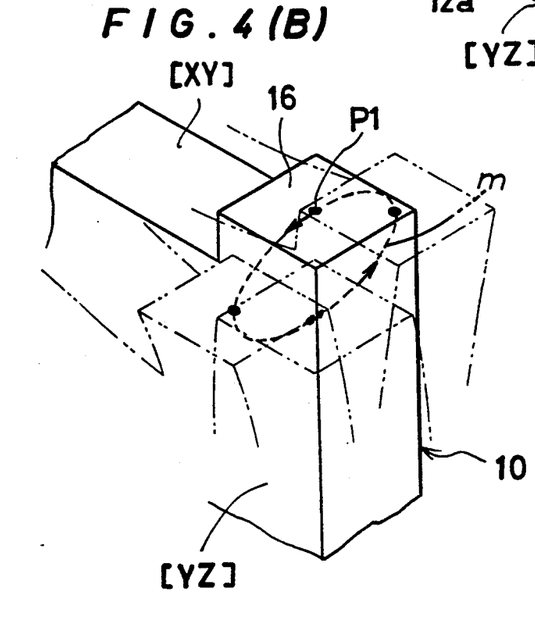
FIG. 4(B) is a partially enlarged perspective view of FIG. 4(A)

In the first embodiment of this invention illustrated in FIG. 4(A), motion extracting means 16 are formed in the shape of a protrusion on the vibrational loops of the longitudinal vibrations at the opposite ends P1, P2 of the most slender plane [XY] perpendicular to the excitation surfaces [YZ] of the vibration member 10. A moving object 18 shaped in a disk is forcibly pressed against the motion extracting means 16. An elliptic motion m at the portion P1 is in one direction as shown in FIG. 4(B), and the motion extracting means 16 at the portion P2 which is opposite in phase relative to the portion P1 gives rise to an elliptic motion in the opposite direction. Thus, the moving object 18 being in press contact with the motion extracting means 16 is rotated in one direction.

In the illustrated embodiment, the protrusions serving as the motion extracting means 16 are formed at the opposite end portions of the most slender plane [XY], but not necessary located at the end portions of the plane [XY]. If the motion extracting means are located at or around the vibrational loops of the bending vibrations, they may be formed anywhere on the most slender plane.

Figure 5:
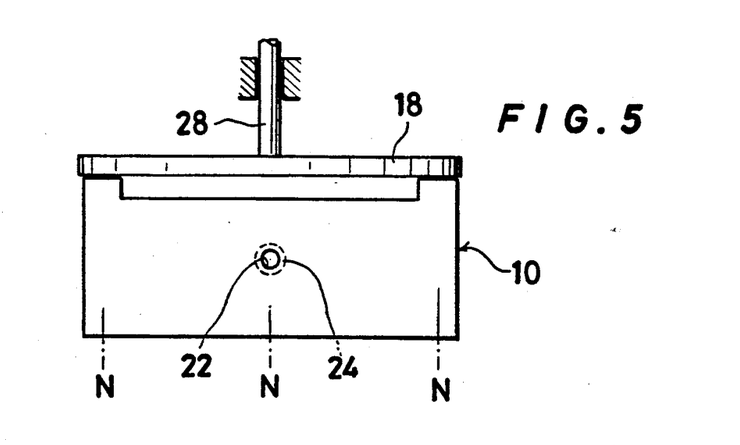
FIG. 5 is a schematic side view of a second embodiment of this invention.

Thus, an ultrasonic motor using rotational energy brought about by the moving object 18 can be accomplished by retaining the vibration member 10 and the moving object 18 as illustrated in FIG. 5.

That is, the vibration member 10 is fixed by a fixing means 24 inserted into a hole 22 formed in the vibration member 10. The hole 22 is positioned at the vibrational node N of the vibrations induced in the vibration member 10 so as to prevent the vibrations in the vibration member from being damped. The moving object 18 is rotatably supported by a rotary shaft 28 used as an output shaft. However, the illustrated embodiment should not be understood as limitative. For example, gears or any other possible means may be used as a rotation outputting system in place of the rotary shaft.

As described above, according to this invention, the energy of the vibrations induced in the vibration member 10 can be converted to rotary motion with high efficiency only by pressing the moving object against the most slender plane of the vibration member 10. Since the vibration member is sufficiently large in the direction in which the moving object is pressed (z-direction), it can withstand the force applied thereto by the moving object. Therefore, the vibration member does not cause stress deformation nor stress strain, and the vibrational characteristic of the vibration member can be stably maintained.

Figure 6:
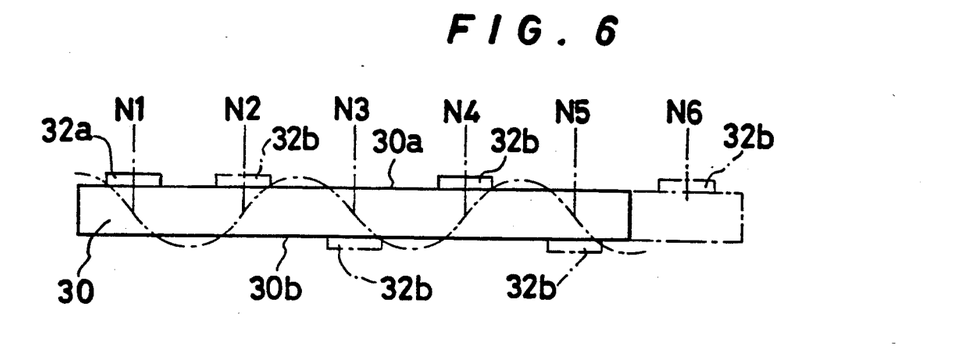
FIG. 6 is a schematic explanatory view showing the arrangement of vibrators used in this invention.

Though two vibrators are disposed one on either excitation surface of the vibration member 10 in the aforenoted embodiment, two or more vibrators may be attached onto one excitation surface of the vibration member. In this case, as shown in FIG. 6, the vibrators 32a, 32b are disposed on one excitation surface 30a of the vibration member 30 in such a state that the first vibrator 32a is located at the first vibrational node N1 of the vibrations induced in the vibration member 30, and the other vibrator 32b is located at one of the even numbered nodes N2, N4, ... In the case of disposing the vibrators 32a, 32b on the opposite excitation surfaces of the vibration member 30 respectively, the first vibrator 32a is located at the first vibrational node N1 on one of the opposite excitation surfaces and the other vibrator 32b is located at one of the odd numbered nodes N3, N5, ... on the other excitation surface.

That is to say, in the case that the vibrators 32a, 32b are disposed on one of the excitation surfaces (30a or 30b) of the vibration member 30, they are located at the opposite-phase nodes of the vibrations induced in the vibration member 30, and on the other hand, when the vibrators 32a, 32b are separately on the opposite excitation surfaces (30a and 30b) of the vibration member 30, they are located at the nodes of the vibrations which are equal in phase (in-phase vibrational nodes).

Figures 7, 8:
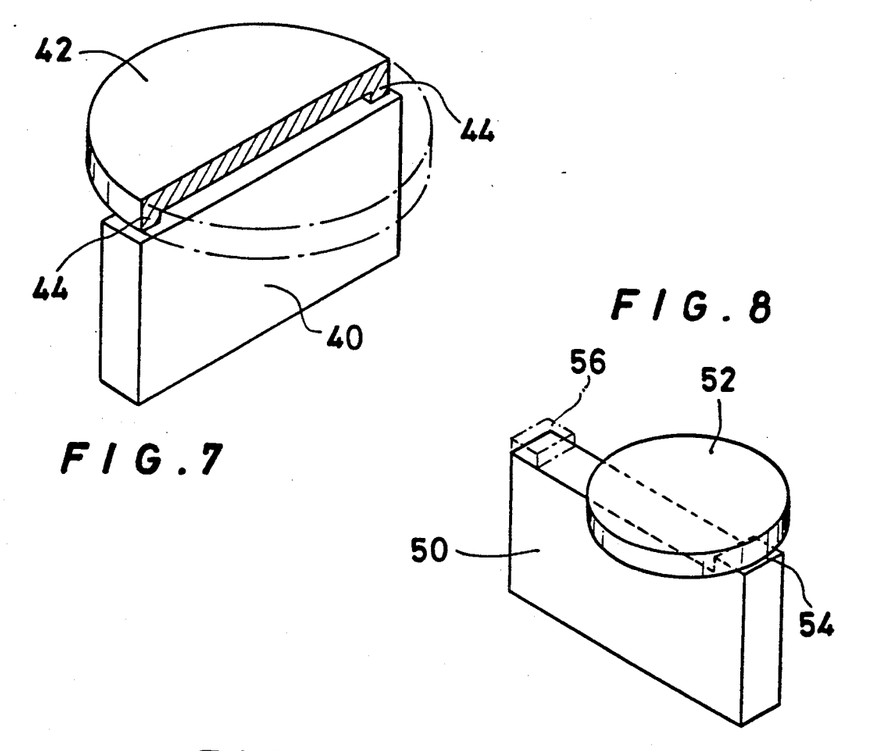
FIG. 7 is a schematic perspective view of a third embodiment of this invention.
FIG. 8 is a schematic perspective view of a fourth embodiment of this invention.

Although the motion extracting means 16 in the first embodiment shown in FIG. 4(A) are formed by protruding the motion extracting portions P1, P2 at the opposite ends of the most slender plane [XY], they are not necessarily protruded. Instead, the moving object 42 may be provided on one surface thereof with a fringe protrusion 44 as shown in FIG. 7, so that the fringe protrusion 44 is brought in direct contact with the most slender plane [XY] of the vibration member 40.

Also, two protrusions serving as the motion extracting means are not necessarily formed on the most slender plane [XY]. For example, a vibration member 50 is provided with only one protrusion 54 as shown in FIG. 8, so as to bring a moving object 52 into contact with the protrusion 54. In this case, another protrusion 56 is not necessary.

Figure 9:
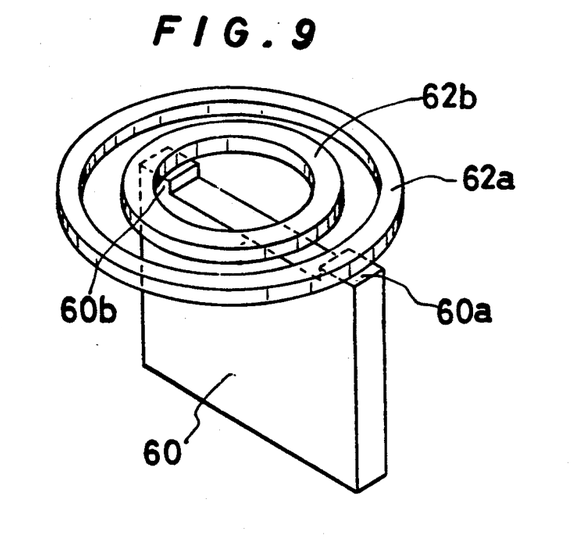
FIG. 9 is a schematic explanatory view of a fifth embodiment of this invention.

In the fifth embodiment of this invention shown in FIG. 9, two ring-shaped moving objects 62a, 62b having different diameters are respectively brought in contact with motion extracting means 60a, 60b which are formed in the shape of a protrusion on the most slender plane of the vibration member 60. By pressing the moving objects 62a, 62b against the vibration member 60 being vibrated, the moving objects 62a, 62b are simultaneously driven to rotate in opposite directions.

Figures 10, 11:
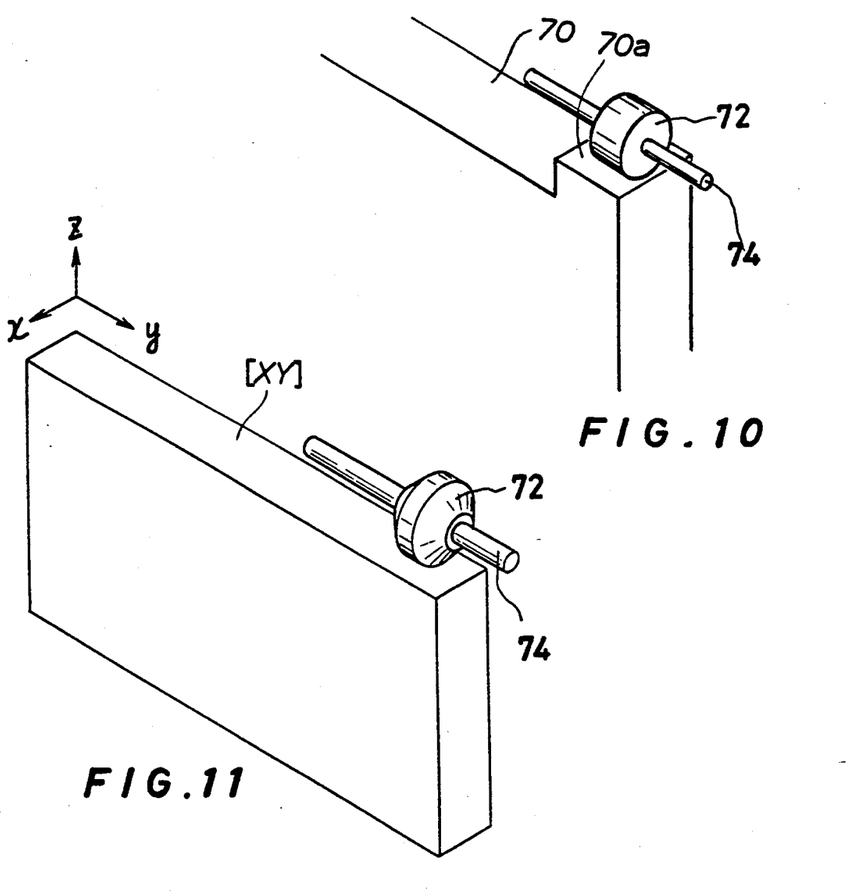
FIG. 10 is a schematic perspective view of a sixth embodiment of this invention.
FIG. 11 is a schematic perspective view of a seventh embodiment of this invention.

The sixth embodiment shown in FIG. 10 employs a cylindrical rotor 72 as the aforenoted moving object. In this embodiment, a motion extracting means 70a is formed in the shape of a protrusion on a vibration member 70. The motion extracting means is not necessarily protruded from the plane [XY] of the vibration member 70 as illustrated in FIG. 11. Thus, the rotor 72 being in press contact with the vibration member 70 being vibrated is rotated about a support shaft 74 arranged in the y-direction (lengthwise direction of the most slender plane [XY]). As the shape of the rotor 72 is somewhat modified in this embodiment, it is by no means limitative.

Figure 12:
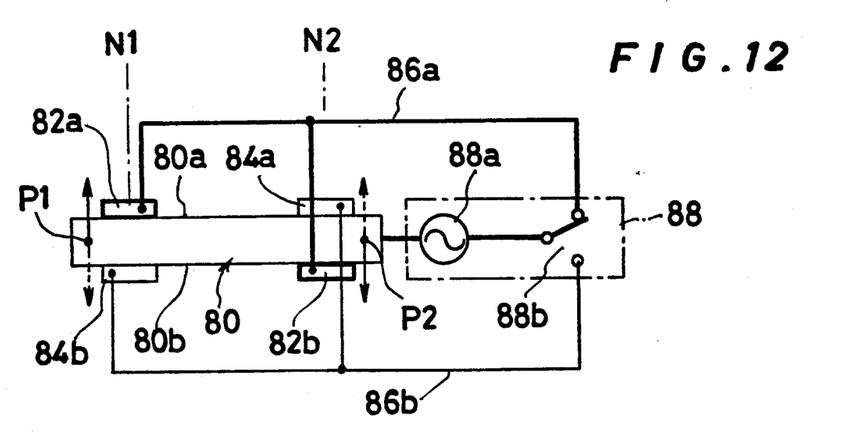
FIG. 12 is a schematic side view of a seventh embodiment of this invention.

The moving object as mentioned above can easily be rotated in the reverse direction by a driving system as schematically illustrated in FIG. 12.

In this seventh embodiment, two pairs of vibrators 82a, 82b and 84a, 84b made of a piezoelectric material are attached onto the opposite broadest planes (excitation surfaces) 80a, 80b of a vibration member 80. The first paired vibrators 82a, 82b are disposed one on either plane 80a, 80b of the vibration member 80 and located at the opposite-phase positions of the nodes N1 to N2 of the vibrations induced in the vibration member 80. The second paired vibrators 84a, 84b are opposite to the vibrators 82a, 82b and located at the opposite-phase positions of the nodes N1 to N2 of the vibrations induced in the vibration member 80. The first paired vibrators 82a, 82b are connected through a circuit line 86a to an exciting means 88 including an exciting current source 88a and a changeover switch 88b. The second paired vibrators 84a, 84b are connected to the exciting means 88 through a circuit line 86b.

When a high-frequency alternating current from an exciting current source 88a is applied between the first paired vibrators 82a, 82b and the vibration member 80 through the changeover switch 88b as shown in FIG. 12, the vibration member 80 is activated by the vibrators 82a, 82b to generate longitudinal and bending vibrations involving elliptic motions caused in opposite directions on motion extracting portions P1 and P2 as indicated by the solid lines in the drawing. By turning the switch 88b to the terminal connected with the circuit line 86b, the vibration member 80 is activated by the vibrators 84a, 84b to cause elliptic motions in the opposite directions as indicated by the dotted lines in FIG. 12. That is to say, the elliptic motion generated on the motion extracting portion can easily be changed in rotational direction by turning the switch 88b. Thus, a reversible motor can be accomplished.

Figure 13:
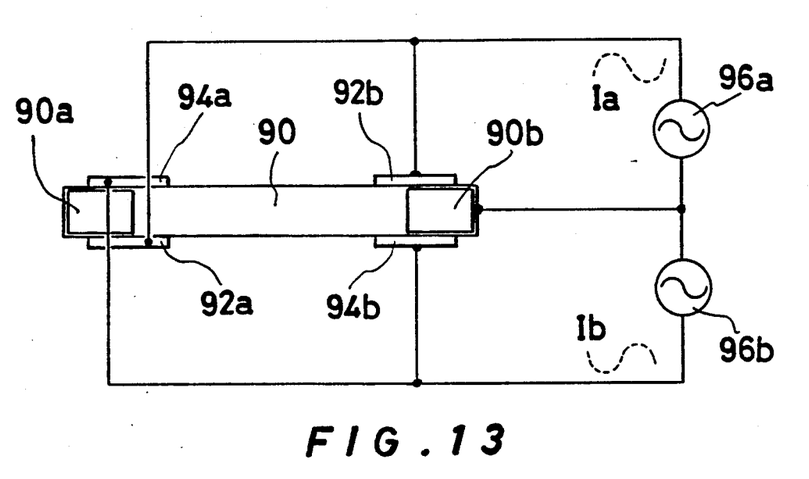
FIG. 13 is a schematic side view of an eighth embodiment of this invention.

Otherwise, the rotational direction of the elliptic motion generated on the motion extracting portion can easily be changed by using two-phase exciting current sources 96a, 96b as shown in FIG. 13. Namely, paired vibrators 92a, 92b and 94a, 94b are respectively attached to opposite-phase portions at the nodes of vibrations induced in the vibration member 90. The exciting current source 96a to be applied between the paired vibrators 92a, 92b and the vibration member 90 with an exciting current Ia is opposite in phase by 90° to an exciting current Ib to be applied to the other paired vibrators 94a, 94b by the exciting current source 96b. By operating either of the exciting current sources 96a, 96b to vibrate the vibration member 90, elliptic motion in one direction relative to the center of the most slender plane is produced on the respective motion extracting portions. Inversely, by operating the other exciting current source 96b or 96a, elliptic motion in the opposite direction is likewise produced. Thus, a reversible motor can be attained by using the exciting current sources which are delivered of exciting currents different in phase.

Figure 14:
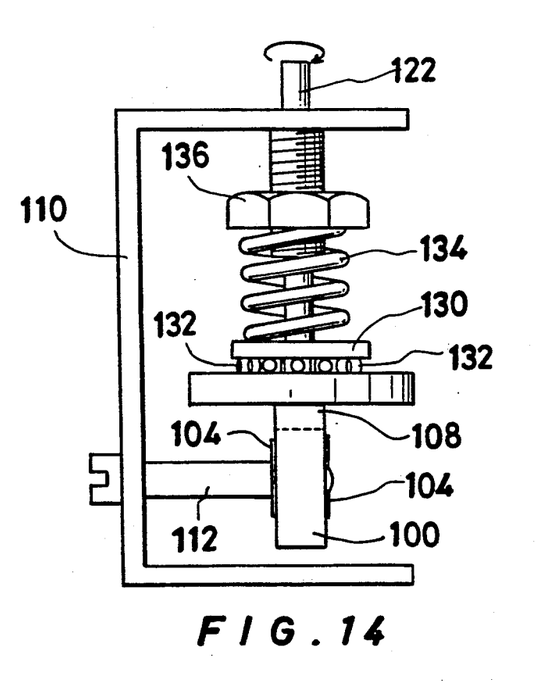
FIG. 14 is an explanatory view schematically showing a tenth embodiment of this invention used in the experimentation for evaluating the performance of the actuator of the invention.

FIG. 14 represents the tenth embodiment which was experimentally used for evaluating the performance of the ultrasonic actuator of the invention.

The illustrated actuator comprises a vibration member 100 provided on opposite excitation surfaces with a pair of vibrators 104 and having motion extracting means 108 protruding from one of the most slender planes which are perpendicular to the aforesaid excitation surfaces. The vibration member 100 is made of a stainless steel plate having a length of 31 mm, a width of 25.5 mm and a thickness of 5 mm. The motion extracting means 108 has a height of 5 mm. To the vibration member 100 is contacted a moving object 120 made of a steel plate having a diameter of 35 mm. The moving object 120 has a output shaft 122 rotatably supported by a frame 110.

The moving object 120 is forcibly pressed against the vibration member 100 by an energizing means comprised of a pressure plate 130 being in indirect contact with the moving object through rubber rollers 132 and a spring 134. The energizing means further has a regulating screwed member 136.

Figure 15:
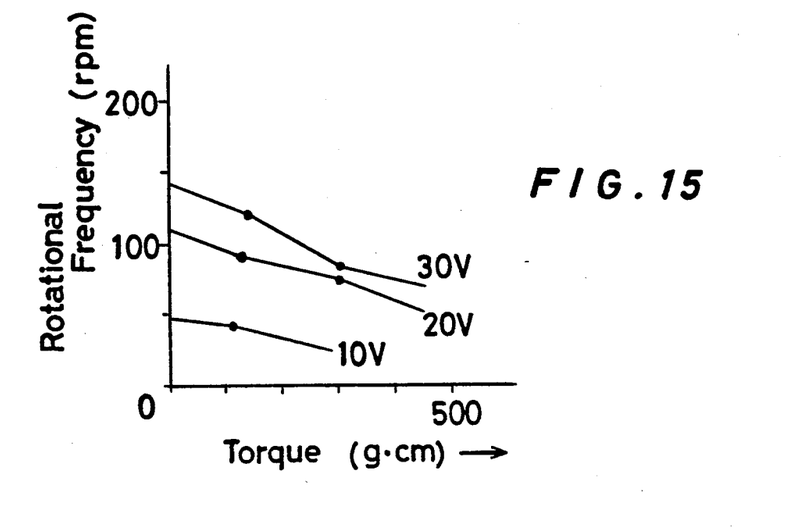
FIG. 15 is a graph showing driving characteristics of the actuator of FIG. 14.

In the experiment, a pressure of 750 grams was applied to the moving object 120. The measurement was carried out by supplying alternating currents having a frequency of 102.6 kHz and voltages of 10V, 20V and 30V in order. As is evident from the experimental results shown in FIG. 15, the moving object was rotated at 80 rpm delivering a torque as high as about 500 g.cm when the excitation current having voltages of 20V and 30V were supplied.

It was confirmed experimentally that the ultrasonic actuator according to this invention has excellent performance which cannot for a moment compare with the conventional ultrasonic motors of this type in which a moving object is forcibly pressed against one of the excitation surfaces (broadest planes) of a vibration member.

Figures 16, 17:
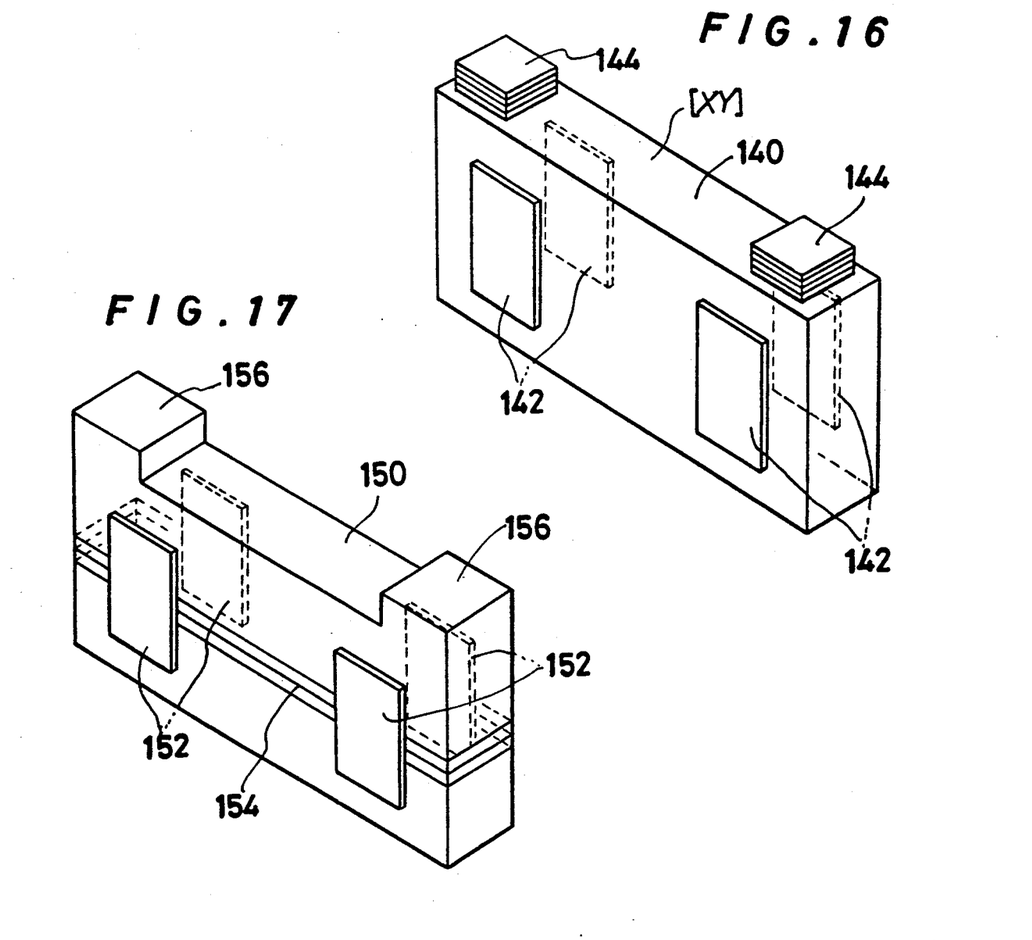
FIG. 16 is a schematic perspective view of an eleventh embodiment of this invention.
FIG. 17 is a schematic perspective view of a twelfth embodiment of this invention.

The embodiment shown in FIG. 16 has motion extracting means 144 made of laminated piezoelectric materials which are disposed on one of most slender planes [XY] of a vibration member 140. Vibrators 142 are attached to the excitation surfaces (broadest planes) of the vibration member 140. The laminated motion extracting means is excited to expand and contract perpendicularly to the most slender plane [XY] by longitudinal vibrations generated in the vibration member 140 by the vibrators 142. Thus, a moving object (not shown) in press contact with the laminated motion extracting means 144 acquires a floating force. As a result, by exciting the vibrators 142, the motion extracting portions on the laminated motion extracting means 144 impart elliptic motion to drive the moving object in one direction.

In the embodiment shown in FIG. 17, a vibration member 150 incorporates a vibrator 154 of a piezoelectric material so as to generate longitudinal vibrations. The vibrator 154 is arranged in parallel to the most slender planes of the vibration member 150 so as to be excited to expand and contract perpendicularly to the most slender planes. The vibration member 150 is excited to generate longitudinal and bending vibrations by vibrators 152 attached to the excitation surfaces (broadest planes) of the member 150. Therefore, when a moving object (not shown) is pressed against the exciting vibration member 150, it is driven to rotate in one direction.

As described in detail above, since the ultrasonic actuator of this invention has the structure to press a moving object against one of the most slender planes of a vibration member, the moving object can be effectively driven even by a single phase electric source with high torque and prevent the vibrational characteristics of the vibration member from being changed even when the moving object is forcibly pressed against the vibration member with great force. Besides, according to this invention, a reversible motor of small size which is excellent in controllability and driving performance can be fulfilled.

As many apparently widely different embodiments of this invention may be made without departing from the spirit and scope thereof, it is to be understood that the invention is not limited to the specific embodiments thereof except as defined in the appended claims.

What is claimed is:

1. An ultrasonic actuator comprising:
   an elastic vibration member of a rectangular plate having a shape capable of concurrently inducing longitudinal and bending vibrations each forming vibrational loops and nodes with an alternating current of resonant frequency, said vibration member having two opposite excitation surfaces being broadest in area, and two opposite most slender planes perpendicular to said opposite excitation surfaces, said most slender planes having opposite end portions,
   at least one vibrator attached to at least one of said excitation surfaces of the vibration member and located at one of the vibrational nodes of the longitudinal vibrations and one of the vibrational loops of the bending vibrations induced in said vibration member,
   at least one exciting current source for applying the alternating current to said vibrator to induce the longitudinal and bending vibrations in said vibration member,
   one of said most slender planes of said vibration member having two motion extracting means defined at the opposite end portions of said most slender plane at which two of the vibrational loops opposite in phase of the bending vibrations are induced, and
   a disk-shaped moving object being in press contact with both said motion extracting means.

2. The ultrasonic actuator according to claim 1 wherein said moving object has a fringe protrusion being in press contact with both said motion extraction means.

3. The ultrasonic actuator according to claim 1 wherein one of said excitation surfaces has said vibrators located at the vibrational loops being equal in phase on the most slender plane.

4. The ultrasonic actuator according to claim 1 wherein said excitation surfaces each have the respective vibrators located at the vibrational loops opposite in phase.

5. The ultrasonic actuator according to claim 1 wherein said motion extracting means are each shaped in a protrusion on said most slender plane.

6. The ultrasonic actuator according to claim 1 wherein said vibration member is provided on the first and second excitation surfaces thereof with the vibrators in a first pair and the vibrators in a second pair, said vibrators in the first pair being disposed opposite to said vibrators in the second pair, said vibrators in each pair being located at the vibrational nodes opposite in phase, said vibrators in the first pair being connected to said exciting current source through a first circuit line, said vibrators in the second pair being connected to said exciting current source through a second circuit line, said first and second circuit lines being selectively switched over to each other by a changeover switch.

7. The ultrasonic actuator according to claim 1 wherein said vibration member is retained by a fixing means at the said vibrational nodes of the longitudinal and bending vibrations.

8. An ultrasonic actuator comprising:
   an elastic vibration member of a rectangular plate having a shape capable of concurrently inducing longitudinal and bending vibrations each forming vibrational loops and nodes with an alternating current of resonant frequency, said vibration member having two opposite excitation surfaces being broadest in area, and two opposite most slender planes perpendicular to said opposite excitation surfaces, said most slender planes having opposite end portions,
   at least one vibrator attached to at least one of said excitation surfaces of the vibration member and located at one of the vibrational nodes of the longitudinal vibrations and one of the vibrational loops of the bending vibrations induced in said vibration member,
   at least one exciting current source for applying an alternating current to said vibrator to induce the longitudinal and bending vibrations in said vibration member,
   one of said most slender planes of said vibration member being having two motion extracting means defined at the opposite end portions of said most slender plane at which two of the vibrational loops opposite in phase of the bending vibrations are induced, and at least one moving object shaped in a ring and being in press contact with at least one of said motion extracting means.

9. The ultrasonic actuator according to claim 8 wherein two of said moving objects different in diameter are in contact with the respective motion extracting means.

10. An ultrasonic actuator comprising:
an elastic vibration member of a rectangular plate having a shape capable of concurrently inducing longitudinal and bending vibrations each forming vibrational loops and nodes, said vibration member having two opposite excitation surfaces being broadest in area, and two opposite most slender planes perpendicular to said opposite excitation surfaces, said most slender planes having opposite end portions,
two pair of vibrators attached to said opposite excitation surfaces of said vibration member and located at the vibrational nodes of the longitudinal vibrations induced in said vibration member and at the vibrational loops of the bending vibrations induced in said vibration member,
two exciting current sources for applying alternating currents opposite in phase to said vibrators to induce the longitudinal and bending vibrations in said vibration member,
one of said most slender planes of said vibration member having two motion extracting means defined at the opposite end portions of said most slender plane at which two of the vibrational loops opposite in phase of the bending vibrations are induced, and
at least one moving object being in press contact with at least one of said motion extracting means.

11. An ultrasonic actuator comprising:
an elastic vibration member of a rectangular plate having a shape capable of concurrently inducing longitudinal and bending vibrations each having vibrational loops and nodes, said vibration member having two opposite excitation surfaces being broadest in area and two opposite most slender planes perpendicular to said opposite excitation surfaces,
at least one vibrator attached to at least one of said excitation surfaces of the vibration member and located at one of the vibrational nodes of the longitudinal vibrations and one of the vibrational loops of the bending vibrations induced in said vibration member,
at least one exciting current source for applying an alternating current to said vibrator to induce the longitudinal and bending vibrations in said vibration member,
at least one motion extracting means made of laminated piezoelectric materials, said motion extracting means being disposed on one of said most slender planes so as to be excited to expand and contract perpendicularly to said most slender plane by said longitudinal vibrations generated in the vibration member, and
at least one moving object being in press contact with said motion extracting means.

12. An ultrasonic actuator comprising:
an elastic vibration member of a rectangular plate having a shape capable of concurrently inducing longitudinal and bending vibrations each forming vibrational loops and nodes, said vibration member having two opposite excitation surfaces being broadest in area, and two opposite most slender planes perpendicular to said opposite excitation surfaces, said most slender planes having opposite end portions,
at least one first vibrator attached to at least one of said excitation surfaces of the vibration member and located at one of the vibrational nodes of the longitudinal vibrations and one of the vibrational loops of the bending vibrations induced in said vibration member,
at least one exciting current source for applying an alternating current to said vibrator to induce the longitudinal and bending vibrations in said vibration member,
one of said most slender planes of said vibration member having two motion extracting means defined at the opposite end portions of said most slender plane at which two of the vibrational loops of the bending vibrations are induced,
a second vibrator located within said vibration member and arranged at least partially in parallel to said most slender planes so as to be excited to expand and contract perpendicularly to said most slender planes, and
at least one moving object being in press contact with at least one of said motion extracting means.

* * * * *